US012692928B2

(12) United States Patent
Shukla

(10) Patent No.: US 12,692,928 B2
(45) Date of Patent: Jul. 28, 2026

(54) ROTATIONAL PLANETARY GEARBOX FOR ENERGY OPTIMIZATION

(71) Applicant: Quill Electrotec Private Limited, Gandhinagar (IN)

(72) Inventor: Bhavik Nikulbhai Shukla, Gandhinagar (IN)

(73) Assignee: Quill Electrotec Private Limited, Gandhinagar (IN)

( * ) Notice: Subject to any disclaimer, the term of this patent is extended or adjusted under 35 U.S.C. 154(b) by 0 days.

(21) Appl. No.: 19/101,013

(22) PCT Filed: Aug. 5, 2023

(86) PCT No.: PCT/IN2023/050754
§ 371 (c)(1),
(2) Date: Feb. 4, 2025

(87) PCT Pub. No.: WO2024/028903
PCT Pub. Date: Feb. 8, 2024

(65) Prior Publication Data
US 2026/0029038 A1 Jan. 29, 2026

(30) Foreign Application Priority Data
Aug. 5, 2022 (IN) .............................. 202221044913

(51) Int. Cl.
*F16H 57/029* (2012.01)
*F16H 1/28* (2006.01)
(Continued)

(52) U.S. Cl.
CPC ............. *F16H 1/28* (2013.01); *F16H 57/029* (2013.01); *F16H 57/031* (2013.01); *F16H 57/082* (2013.01); *F16H 2057/085* (2013.01)

(58) Field of Classification Search
CPC ........ F16H 1/28; F16H 57/029; F16H 57/031; F16H 57/082; F16H 2057/085
See application file for complete search history.

(56) References Cited

U.S. PATENT DOCUMENTS 3,482,469 A * 12/1969 Mori ..................... F16H 47/085
475/205
5,106,352 A * 4/1992 Lepelletier ................ F16H 3/66
475/284
(Continued)

*Primary Examiner* — Farhana Pervin
(74) *Attorney, Agent, or Firm* — MacCord Mason PLLC

(57) ABSTRACT

The present invention relates to a rotational planetary gearbox comprises a body (15) having an input shaft (4), an output shaft (5), a fixed sun gear (3), a rotatable sun gear (8), a carrier (14), a plurality of input planet gear (9) and a plurality of guide planet gear (11), a planet shaft (10). The rotatable sun gear (8) fixed on the input shaft (4) and input planet gears (9) are engaged with rotatable sun gear (8). Said input planet gears (9) supported through planet shaft (10) mounted between carriers (14). The guide planet gear (11) mounted on the extended planet shaft (10) and said guide planet gear (11) engaged with fixed sun gear (3). The output shaft (5) rigidly mounted on output side carrier (7). Arrangement of these gears saves the energy and provides more efficiency and millage in field of industrial sector, automobile industries, Electric vehicles segment etc.

7 Claims, 1 Drawing Sheet

(51) Int. Cl.
     *F16H 57/031*     (2012.01)
     *F16H 57/08*      (2006.01)

(56)                    References Cited

U.S. PATENT DOCUMENTS

| | | | | | |
|---|---|---|---|---|---|
| 5,429,557 | A | | 7/1995 | Beim | |
| 8,801,565 | B2 | * | 8/2014 | Hart ........................ | F16H 3/663 |
| | | | | | 475/296 |
| 2012/0196720 | A1 | * | 8/2012 | Miyawaki .......... | G03G 15/1615 |
| | | | | | 475/345 |
| 2018/0283503 | A1 | * | 10/2018 | Georgiev .............. | H02K 1/278 |
| 2019/0078674 | A1 | * | 3/2019 | Dzafic ................... | F16H 37/082 |
| 2020/0180421 | A1 | * | 6/2020 | Dempel ................. | B60K 6/547 |
| 2020/0263613 | A1 | * | 8/2020 | Simon ................... | F16H 57/043 |
| 2025/0224031 | A1 | * | 7/2025 | Cihlar ...................... | F16H 1/28 |

* cited by examiner

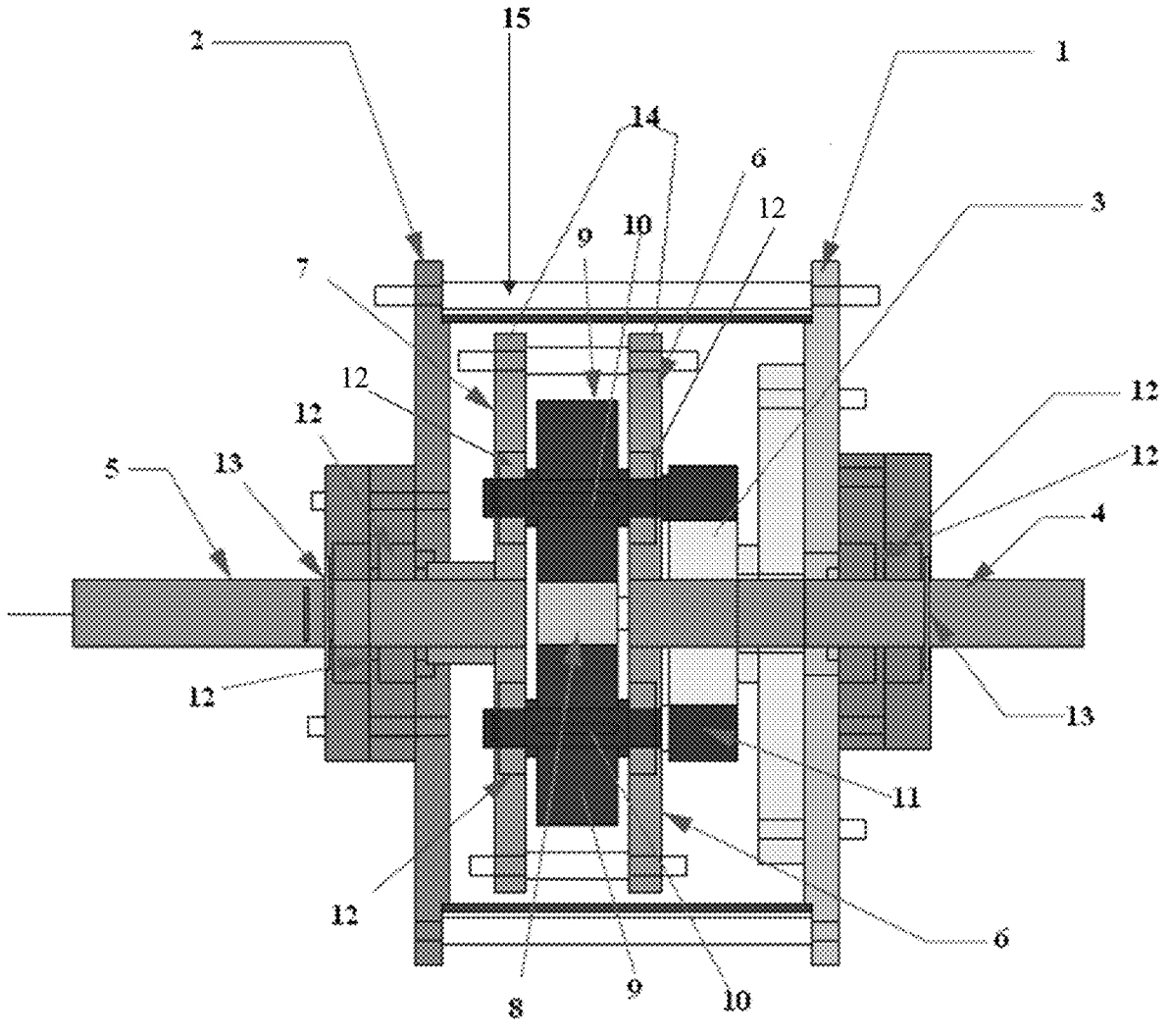

ROTATIONAL PLANETARY GEARBOX FOR ENERGY OPTIMIZATION

FIELD OF INVENTION

The present invention relates to a rotational planetary gearbox for energy optimization and more particularly it relates to the slippage free gearbox which saves the input energy and provides more efficiency in terms of torque and speed.

BACKGROUND OF INVENTION

The gearbox is an essential component of machines used in various industries and fields. The purpose of gearboxes is to increase the output torque or to change the speed (revolution per minute) of a motor. The shaft of the motor is connected to one end of the gearbox and through the internal configuration of gears, provides a given output torque and speed determined by the gear ratio. Gearboxes are used in agricultural, industrial, construction, mining, and automotive equipment and are available in different designs and specifications.

The main function of this transmission is to provide high torque at the time of starting, accelerating, and pulling a load. There are mainly four number of gearbox. Namely, Sliding mesh type gearbox, Constant-mesh type gearbox, Synchromesh gearbox and Planetary (Epicyclic) gearbox. In ordinary planetary gear set, the axes of the various gears are fixed, the motion of the gears being simply rotations about their own axes. In planetary or epicyclic gearing, at least one gear not only rotates, about its own axis but also rotates bodily about some other axis.

Planetary gearbox contains sun gear, ring gear, plurality of planetary gears and carrier. These types of gearbox are the most widely used automatic transmission system. In an automatic transmission system, there is only an accelerator and brake is provided. So there will not be any clutch pedal or gear lever available on the vehicle. Such planetary gear sets are provided for many applications in automotive technology and other technical fields. A planetary gear design methodology should not only result in better gear set designs, but also save time and costs in the design process.

In such gear set an input shaft connects the differential gear system to a sun gear of the planetary stage and an output shaft is driven, via a carrier, when the ring gear is stationary. As a rule such planetary stages comprise gearwheels and a toothed rim of the ring gear with straight teeth, so that when the teeth engage no axial forces are produced that would act upon the input shaft. The disadvantage of planetary stages with straight teeth is that they do not run very smoothly, so a lot of noise is emitted.

CN1288829 comprises vehicle speed-controlling stepless speed variator, comprise planetary gears and fluid torque converter, planetary gears comprises sun gear, annular gear and planet carrier, fluid torque converter comprises turbine and pump impeller, the power intake of planetary gears links to each other with motor, its output terminal links to each other directly or indirectly with the pump impeller of fluid torque converter, the turbine of fluid torque converter links to each other with turbine shaft, turbine shaft links to each other with feedback gear, and through this turbine shaft output torque that links to each other with wheel, and the other end of described feedback gear and planetary gears directly or indirectly is meshed with a transition gear assembly.

Further in U.S. Pat. No. 5,429,557 A the two planetary gear sets are arranged coaxially over the output shaft and form the main gear set of this known automatic transmission. The ring gear of the radially inner planetary gear set and the sun gear of the radially outer planetary gear set are formed integrally, i.e., combined in a single, common transmission component. The planetary carriers of the two planetary gear sets are solidly connected to one another and are in driving connection with the output shaft.

In above mentioned prior arts one of the gears i.e., sun gear, ring gear and carrier must be in fixed position. Further these gearboxes generate less torque which is not efficient and waste the input energy. Further conventional gearbox only works on rolling motion without slipping law in vertical manner only. Hence, there is need to provide a planetary gearbox which works in rotational manner with the same law for energy optimization and to provide higher torque.

OBJECT OF INVENTION

The main object of the present invention is to provide a rotational planetary gearbox for energy optimization.

Another object of the present invention is to provide a rotational planetary gearbox for energy optimization which saves energy in terms of power.

Still another object of the present invention is to provide a rotational planetary gearbox for energy optimization which gives more efficiency.

Another object of the present invention is to provide rotational planetary gearbox which works on the principle of rolling motion without slipping in rotational manner.

Another object of the present invention is to provide rotational planetary gearbox which minimizing the friction loss.

Yet another object of the present invention is to provide a rotational planetary gearbox for energy optimization which provides almost 1.25 times higher torque compared to conventional planetary gearbox.

Still another object of the present invention is to provide a rotational planetary gearbox to energy optimize in the sector of industry and automobile.

Yet another object of the present invention is to provide a rotational planetary gearbox for energy optimization which provides more mileage in electrical vehicles.

Yet another object of the present invention is to provide rotational planetary gearbox which overcomes the shortcoming and drawbacks of the prior conventional planetary gearbox.

SUMMARY OF INVENTION

The present invention relates to a rotational planetary gearbox for energy optimization. The present invention mainly comprises a body having an input shaft, an output shaft, a fixed sun gear, a rotatable sun gear, a carrier, a plurality of input planet gear and a plurality of guide planet gear, a planet shaft. The rotatable sun gear fixed on the input shaft and input planet gears are engaged with the rotatable sun gear. Said input planet gears supported through the planet shaft mounted between the carriers. The guide planet gear mounted on the extended planet shaft and said guide planet gear engaged with the fixed sun gear. The output shaft rigidly mounted on the output side carrier. Arrangement of these gears saves the input energy and provides more efficiency and millage which can be used in many sectors and getting energy saving machine in terms of torque. This invention provides almost 1.25 times higher torque and slippage free planetary gearbox compared to conventional mechanism. It is applicable in field of industrial sector, automobile industries, Electric vehicles segment, energy sector, windmill plants, thermal plants, hydro plants, oil industries, etc.

BRIEF DESCRIPTION OF DRAWINGS

Other objects, advantages and novel features of the invention will become apparent from the following detailed description of the present embodiment when taken in conjunction with the accompanying drawings.

FIG. 1 shows a block view of a rotational planetary gearbox according to the present invention.

DETAILED DESCRIPTION OF INVENTION

The nature of the invention and the manner in which it works is clearly described in the provisional specification. The invention has various embodiments and they are clearly described in the following pages of the provisional specification. Before explaining the present invention, it is to be understood that the phraseology and terminology employed herein is for the purpose of description and not of limitation.

The invention discloses rotational planetary gearbox for energy optimization having an application at the Industries and automobile field.

The present invention is a rotational planetary gearbox as shown in FIG. 1. The present invention mainly comprises a body (15) having an input shaft (4), an output shaft (5), a fixed sun gear (3), a rotatable sun gear (8), a carrier (14), a plurality of input planet gear (9) and a plurality of the guide planet gear (11), a planet shaft (10).

As shown in FIG. 1, a body (15) made from the two circular end plates (1, 2) opposite to each other which comprise whole gear box assembly. At the circular end plate (1) of the body (15) configured with the fixed sun gear (3) which is fixed in the axial direction towards the circular end plate (2) in horizontal axis. Said fixed gear is a helical type gear having the teeth slanted at an angle of 25°-45°.

The input shaft (4) is passed through the centroid borehole of circular end plate (1) and the fixed sun gear (3) assembly. In the borehole of the circular end plate (1) and between said circular end plate (1) and the input shaft (4), the bearings (12) with the oil seal (13) are provided. Bearing (12) provides to rotate the shaft with minimal friction and seal rings prevent such bearing (12) from leakage and to protect the shaft and bearing (12) from ingress of dirt or foreign matter.

In similar way, the output shaft (5) is shaft is passed through the centroid borehole of circular end plate (2). In the borehole of the circular end plate (2) and between said circular end plate (2) and the output shaft (5), the bearings (12) with the oil seal (13) are provided. Bearing (12) provides to rotate the shaft with minimal friction and Seal rings prevent such bearing (12) from leakage and to protect the shaft and bearing (12) from ingress of dirt or foreign matter.

The input shaft (4) is provided with the rotatable sun gear (8) which fixed on extreme end of the input shaft (4) followed by input side carrier (6). The bearing (12) is provided between the input shaft (4) and input side carrier (6) and Said input side carrier (6) is rotationally movable over the input shaft (4) through said bearing (12).

In the output, the output side carrier (7) is fixed on the output shaft (5). Both input side carrier (6) and output side carrier (7) are assembled with each other and make whole carrier assembly (14) and the rotatable sun gear (8) is positioned between said input side carrier (6) and output side carrier (7).

The plurality of input planet gear (9) is mounted between the input side carrier (6) and output side carrier (7) through the planet shaft (10) and said planet shaft (10) is mounted between the input side carrier (6) and output side carrier (7) through the bearing (12). Said plurality of input planet gear (9) is engaged with the rotatable sun gear (8) mounted on the input shaft (4) and having opposite hand gear connections between input planet gear (9) and rotatable sun gear (8). Said input planet gear (9) and rotatable sun gear (8) are helical type gear having the teeth slanted at an angle of 25°-45°. The plurality of planet shaft (10) is extended throughout the input side carrier (6) and the guide planet gear (11) mounted at the end of the extended planet shaft (10). Said plurality of the guide planet gear (11) is engaged with the fixed sun gear (3) and having opposite hand gear connections between the guide planet gear (11) and fixed sun gear (3). Said guide planet gear (11) is helical type gear having the teeth slanted at an angle of 25°-45°.

As shown in FIG. 1, when the mechanical input is given to the input shaft (4) of the gear box assembly, the rotatable sun gear (8) rotates as it is assembled with input shaft (4) of the assembly. Due to the rotation of the rotatable sun gear (8), the plurality of input planet gear (9) are rotates surrounding the rotatable sun gear (8) in the anti-rotating direction of the rotatable sun gear (8) as the teeth of the plurality of input planet gear (9) are engaged with the slot of the sun gear in the opposite hand gear connections.

As the input planet gear (9) are situated between the input side carrier (6) and output side carrier (7) through the planet shaft (10), the carrier (14) is also rotate on the same direction as the input planet gear (9) is rotate surrounding the rotatable sun gear (8). Further, the planet shaft (10) individually carries the guide planet gear (11) which engaged with the fixed sun gear (3) mounted on the circular plate (1) of the body (15) and rotate during the rotation of the planet shaft (10). Said guide planet gear (11) is also rotate surrounding the fixed sun gear (3) in the same direction as the input planet gear (9) is rotate surrounding the rotatable sun gear (8).

As the output side carrier (7) is fixed with the output shaft (5), the rotation of the carrier (14) is transmitting to the output shaft (5) and said output rotation is given to the particular application.

Through the above arrangement of the gears in the gear box assembly according to the present invention, the optimum torque and speed can be achieved at the output and makes more efficient transmitter of the rotational/mechanical energy.

The calculation of the output to input gear ratio can be defined by the following formulas:

Gear Ratio of 1$^{st}$ Stage:

$$GR_1 = \frac{Nip}{Ns}$$

Where,

Nip=Number of teeth of Input Planet Gear

Ns=Number of teeth of Rotatable Sun Gear

Gear Ratio of $2^{nd}$ Stage:

$$GR_2 = \frac{Nsf}{Ngp}$$

Where,

Nsf=Number of teeth of Fix Sun Gear

Ngp=Number of teeth of Guide Planet Gear of 10.28:1 in the conventional gear box. To evaluate the performance of the present invention, the motor and gear box combination according to the present invention were replaced with those specified in the existing arrangement of the bucket elevator. The modified setup utilized a 2HP motor and a gear box with a gear ratio of 10.5:1, achieving the desired speed of 140 RPM. The subsequent data gathered from testing both the existing gear box and the gear box according to the present invention and was compared to assess the performance enhancements offered by the present invention. Further details and results of this experiment are presented below table 1.

TABLE 1

| Performance data of the present invention in bucket elevator | |
| --- | --- |
| Existing machine details<br>Without load | By using the present invention<br>Without load |
| Motor Amp: 3.5 A<br>Motor VAC: 3phase, 440 V,<br>5 HP/3.7 KW<br>Motor efficiency (η): 85%<br>Motor working parameter: 1440 RPM ><br>10.28:1 attach Gearbox > 140 RPM ><br>driven Bucket elevator in 140 RPM. | Motor Amp: 2.1 A<br>Motor VAC: 3phase, 440 V,<br>2 HP/1.49 KW<br>Motor efficiency (η): 88%<br>Motor working parameter: 1470 RPM ><br>10.5:1 attach Gearbox > 140 RPM ><br>driven Bucket elevator in 140 RPM. |
| With load: | With load |
| Motor Amp: 4.1 A to 4.3 A<br>Motor VAC: 3phase, 440 V,<br>5 HP/3.7 KW<br>Motor efficiency (η): 75%-82%<br>Motor working parameter: 1440 RPM ><br>10.28:1 attach Gearbox > 140 RPM ><br>driven Bucket elevator in 140 RPM. | Motor Amp: 2.4 A to 2.5 A<br>Motor VAC: 3phase, 440 V,<br>2 HP/1.49 KW<br>Motor efficiency (η): 75%-82%<br>Motor working parameter: 1470 RPM ><br>10.5:1 attach Gearbox > 140 RPM ><br>driven Bucket elevator in 140 RPM. |

The equivalent gear ratio can be defined as follows:

$$GR_{equivalent} = \left(\frac{Nip}{Ns} \times \frac{Nsf}{Ngp}\right) - 1$$

Where,

Nip=Number of teeth of Input Planet Gear

Ns=Number of teeth of Rotatable Sun Gear

Nsf=Number of teeth of Fix Sun Gear

Ngp=Number of teeth of Guide Planet Gear

Through the above arrangement of the gears in the gear box assembly according to the present invention, the optimum torque and speed can be achieved at the output and makes more efficient transmitter of the rotational/mechanical energy.

In the present invention, the input shaft (4) can function as an output shaft (5) and vice versa.

The present invention is illustrated more in details in the following experimental examples. The example describes and demonstrates the embodiments within the scope of the present invention. This example is given solely for the purpose of illustration and is not to be construed as limitations of the present invention, as many variations thereof are possible without departing from spirit and scope.

Experiment 1

The First experiment aimed to test the efficacy of the present invention on a 5HP bucket elevator, commonly utilized for vertically conveying materials across various industries. The bucket elevator consisted of 40 buckets and operated using a 5 HP motor at 140 RPM, with a gear ratio Conclusion From the above experiment, it is conclude that in the vertical bucket conveyor, by using the gear box according to the present invention, the electricity consumption drastically reduced up to 40% compared to the existing machine configuration and due to that the overall efficiency of the machine increase. Further, it works on optimum energy consumption which leads to economical advantages.

Experiment 2

In the Second experiment disclosed the existing flacker machine's power transmission system with a setup based on the present invention. The existing flacker machine was equipped with two 2.5-ton rollers that rotated at a speed of 160 RPM. The power was provided by a 200 HP motor connected to a pulley belt system with a speed ratio of 8.8:1. The hydraulic system used to maintain pressure operated with regular pressures between 800-1000 PSI and higher pressures between 1000-1500 PSI.

In the experiment, the aforementioned arrangement was substituted with a 200 HP motor connected to a gear box, which has a gear ratio of 8.8:1, in accordance with the invention. The aim of the experiment is to assess the performance of the modified flacker machine with the gear box in comparison to the existing setup. The expected outcomes include potential improvements in energy consumption, and the overall effectiveness of the flacking process. The comparison of performance of the existing flacker machine and flacker machine using the gear box according to the present invention are shown below table 2.

TABLE 2

Performance data of the present invention in Flacker machine

| Existing machine details<br>Without load | By using the present invention<br>Without load |
| --- | --- |
| Motor Amp: 114 A<br>Motor VAC: 3phase, 440 V,<br>200 HP/149.2 KW<br>Motor frequency: 46.50 Hz<br>Motor working parameter: 1408 RPM ><br>8.8:1 Pulley-Belt system > 160 RPM ><br>driven Roller in 160 RPM. | Motor Amp: 114 A<br>Motor VAC: 3phase, 440 V,<br>200 HP/149.2 KW<br>Motor frequency: 46.50 Hz<br>Motor working parameter: 1408 RPM ><br>8.8:1 New Gearbox > 160 RPM ><br>driven Roller in 160 RPM. |
| With load: | With load |
| Motor Amp: 141 A to 155 A<br>Motor VAC: 3phase, 440 V,<br>200 HP/149.2 KW<br>Motor frequency: 46.50 Hz<br>Motor working parameter: 1408 RPM ><br>8.8:1 Pulley-Belt system > 160 RPM ><br>driven Roller in 160 RPM. | Motor Amp: 118 A to 129 A<br>Motor VAC: 3phase, 440 V,<br>200 HP/149.2 KW<br>Motor frequency: 46.50 Hz<br>Motor working parameter: 1408 RPM ><br>8.8:1 New Gearbox > 160 RPM ><br>driven Roller in 160 RPM. |

Conclusion

From the above experiment, it is conclude that in the flacker machine, by using the power transmission through the gear box according to the present invention, the elecand the performance data were once again recorded for comparison.

The comparison of performance of the EV with conventional gear box and using the gear box according to the present invention are shown below table 3.

TABLE 3

Performance data of the present invention in Electrial Vehicle

| Sr.<br>No | Parameters | Technical Things<br>while using the<br>conventional gear box | Technical Things<br>while using the<br>present invention |
| --- | --- | --- | --- |
| 1. | HUB motor | 750 W | 750 W |
| 2. | Controller | 60 V DC - 35 A | 60 V DC - 35 A |
| 3. | Battery | 60 V - 24 Ah | 60 V - 24 Ah |
| 4. | Wheel Parameter | 90/90-12 | 90/90-12 |
|  | Diameter inches (mm) | 18.38 (466.8) | 18.38 (466.8) |
|  | Width inches (mm) | 3.54 (90) | 3.54 (90) |
|  | Circum. Inches (mm) | 57.74 (1466.5) | 57.74 (1466.5) |
|  | Sidewall height<br>inches (mm) | 3.19 (81) | 3.19 (81) |
|  | Revolution per<br>mile (mm) | 1097.41 (681.9) | 1097.41 (681.9) |
| 5. | Speed | Min. to Max. (single<br>charge with drive testing) | Min. to Max. (single<br>charge with drive testing) |
|  | Top Speed | 45 Kmph | 45 Kmph |
|  | Single Charge<br>Average | 0-72 Km | 0-92 Km | tricity consumption drastically reduced compared to the existing machine configuration and due to that the overall efficiency of the machine increase.

Experiment 3

In the third experiment, an Electric Vehicle (EV) utilizing two different gearboxes. This experiment aimed to demonstrate the potential improvements and advantages of the gearbox of the present invention in comparison to the traditional gearbox. Initially, the EV was operated using its standard, conventional gearbox, and various performance data were recorded. Subsequently, in order to assess the impact of the new invention, the conventional gearbox was replaced with the gearbox according to the present invention. The EV was then operated under similar conditions, Conclusion From the above experiment, it is conclude that in the Electrical vehicle, by using the power transmission through the gear box according to the present invention, the EV can runs at the top speed and increase the mileage of EV as well as electricity consumption drastically reduced compared to using the conventional gear box configuration in EV.

The present invention have various application in field of industrial sector, automobile industries, Electric vehicles segment, energy sector, windmill plants, thermal plants, hydro plants, oil industries, etc., as it will save energy and provides more efficiency and millage which can be used in many sectors.

In another embodiment numbers of planetary gear sets are provided on the same shaft in serial manner for transmitting high input and output ratios with gears of moderate size.

Further the number of teeth of gears can be modified for required speed and torque as number of teeth depends on the same.

The invention has been explained in relation to specific embodiment. It is inferred that the foregoing description is only illustrative of the present invention and it is not intended that the invention be limited or restrictive there to. Many other specific embodiments of the present invention will be apparent to one skilled in the art from the foregoing disclosure.

REFERENCE NUMERALS

1. Circular end plate
2. Circular end plate
3. Fixed sun gear
4. Input shaft
5. Output shaft
6. Input side carrier
7. Output side carrier
8. Rotatable sun gear
9. Input planet gear
10. Planet shaft
11. Guide planet gear
12. Bearing
13. Oil seal
14. Carrier
15. Body

I claim:

1. A rotational planetary gearbox for energy optimization comprises a body (15) having two circular end plate (1, 2) positioned parallel and opposite to each other; the circular end plate (1) provided with a fixed sun gear (3) having axial direction towards the circular end plate (2) in horizontal axis;

a carrier assembly (14) having an input side carrier (6) and output side carrier (7); said input side carrier (6) and output side carrier (7) are assembled opposite to each other;

a rotatable sun gear (8) rigidly mounted on an input shaft (4) extended in the horizontal axis and disposed in a centroid borehole of the circular end plate (1) followed by the input side carrier (6) and the fixed sun gear (3);

a plurality of input planet gears (9) arranged in between the input side carrier (6) and output side carrier (7) through a plurality of planet shafts (10); said plurality of the input planet gears (9) engaged with the rotatable sun gear (8);

the plurality of planet shafts (10) extended through the input side carrier (6); said extended end of each planet shaft (10), a plurality of guide planet gears (11) mounted; said plurality of guide planet gears (11) engaged with the fixed sun gear (3);

an output shaft (5) is rigidly mounted with the output side carrier (7) of the carrier assembly (14); said output shaft (5) is extended in the horizontal axis and through-out the centroid borehole of the circular end plate (2).

2. The rotational planetary gearbox as claimed in claim 1, wherein the plurality of the input planetary gears and the plurality of the guide planet gears (11) are rotate at the same angular velocity.

3. The rotational planetary gearbox as claimed in claim 1, wherein a bearing (12) with an oil seal (13) are provided in the centroid borehole of circular end plates (1, 2) through which the input shaft (4) and output shaft (5) is extended.

4. The rotational planetary gearbox as claimed in claim 1, wherein the fixed sun gear (3) and the plurality of the guide planet gears (11) are helical gears having teeth slanted at an angle of 25°-45° and are in opposite hand gear connection.

5. The rotational planetary gearbox as claimed in claim 4, wherein the fixed sun gear (3) and the plurality of the guide planet gears (11) are rolling without slippage which reduces friction loss.

6. The rotational planetary gearbox as claimed in claim 1, wherein the rotatable sun gear (8) and the plurality of the input planet gears (9) are helical gears having teeth slanted at an angle of 25°-45° and are in opposite hand gear connection.

7. The rotational planetary gearbox as claimed in claim 1, wherein a bearing (12) is provided in the input side carrier (6) and output side carrier (7) through which the planet shaft (10) is extended.

* * * * *